US011003591B2

United States Patent
Fukumoto

(10) Patent No.: US 11,003,591 B2
(45) Date of Patent: May 11, 2021

(54) ARITHMETIC PROCESSOR, INFORMATION PROCESSING DEVICE AND CONTROL METHOD OF ARITHMETIC PROCESSOR

(71) Applicant: FUJITSU LIMITED, Kawasaki (JP)

(72) Inventor: Naoto Fukumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/516,314

(22) Filed: Jul. 19, 2019

(65) Prior Publication Data

US 2020/0097415 A1   Mar. 26, 2020

(30) Foreign Application Priority Data

Sep. 20, 2018   (JP) .............................. JP2018-176307

(51) Int. Cl.
| | | |
|---|---|---|
| *G06F 12/08* | (2016.01) | |
| *G06F 12/12* | (2016.01) | |
| *G06F 12/10* | (2016.01) | |
| *G06F 9/30*  | (2018.01) | |

(52) U.S. Cl.
CPC ............ *G06F 12/12* (2013.01); *G06F 9/3004* (2013.01); *G06F 12/10* (2013.01); *G06F 2212/1044* (2013.01); *G06F 2212/608* (2013.01)

(58) Field of Classification Search
CPC ...... G06F 12/12; G06F 12/10; G06F 12/1045; G06F 12/0284; G06F 12/0864; G06F 12/121; G06F 12/0811; G06F 12/1036; G06F 9/3004; G06F 2212/1044; G06F 2212/608; G06F 2212/502; G06F 11/34
See application file for complete search history.

(56) References Cited

U.S. PATENT DOCUMENTS

| | | |
|---|---|---|
| 2002/0049889 A1 | 4/2002 | Hoogerbrugge et al. |
| 2016/0124861 A1 | 5/2016 | Fujii et al. |
| 2016/0179375 A1* | 6/2016 | Kirvan ................ G06F 12/0246 |
| | | 711/153 |
| 2019/0066816 A1* | 2/2019 | Dono .................. G11C 29/022 |

FOREIGN PATENT DOCUMENTS

| | | |
|---|---|---|
| JP | 2004-503010 | 1/2004 |
| JP | 2016-91242 | 5/2016 |
| WO | 02/03207 | 1/2002 |

OTHER PUBLICATIONS

Micron Technology, Inc., "Hybrid Memory Cube—HMC Gen2", Hybrid Memory Cube—HMC Gen2, HMC Memory Features, 2018, pp. 1-105, www.micron.com/products/support.

* cited by examiner

*Primary Examiner* — Hiep T Nguyen
(74) *Attorney, Agent, or Firm* — Fujitsu Patent Center

(57) ABSTRACT

An arithmetic processor, having: an arithmetic logical operation unit configured to execute an instruction; and a cache unit including a cache memory configured to store a part of data in a first main memory and a part of data in a second main memory which has a wider band than the first main memory when at least a predetermined capacity of data having consecutive addresses is accessed, and a cache control unit configured to read data in the cache memory responding to a memory request issued by the arithmetic logical operation unit and respond to the memory request source, wherein a ratio of capacity of the data in the second main memory with respect to the data in the first main memory stored in the cache memory is limited to a predetermined ratio or less.

7 Claims, 15 Drawing Sheets

FIG.3

| | M_MEM_1 | M_MEM_2 |
|---|---|---|
| CAPACITY | LARGE | SMALL |
| BASIC ACCESS TIME | SHORT | LONG |
| CONSECUTIVE ADDRESS ACCESS | SLOW | FAST |
| RANDOM ADDRESS ACCESS | FAST | SLOW |

FIG.15

Priority HIGHEST LRU ←→ Priority LOWEST MRU

P1:
| DATA A | DATA C | DATA D | DATA B |
|---|---|---|---|
| M_MEM_1 | M_MEM_1 | M_MEM_1 | M_MEM_1 |

ACCESS TO DATA X (EVICT DATA A HAVING HIGHEST PRIORITY, REGISTER DATA X)

P2:
| DATA X | DATA C | DATA D | DATA B |
|---|---|---|---|
| M_MEM_2 | M_MEM_1 | M_MEM_1 | M_MEM_1 |

DATA X IS NORMALLY REGISTERED AT LOWEST PRIORITY, BUT IS REGISTERED TO CACHE MEMORY AT HIGHEST PRIORITY BECAUSE DATA X IS DATA IN M_MEM_2

ACCESS TO DATA X

P3:
| DATA X | DATA C | DATA D | DATA B |
|---|---|---|---|
| M_MEM_2 | M_MEM_1 | M_MEM_1 | M_MEM_1 |

HIGHEST PRIORITY IS NOT CHANGED BECAUSE DATA X HAD CACHE HIT AND IS DATA IN M_MEM_2

ACCESS TO DATA Y

P4:
| DATA Y | DATA C | DATA D | DATA B |
|---|---|---|---|
| M_MEM_2 | M_MEM_1 | M_MEM_1 | M_MEM_1 |

DATA X IS EVICTED AND DATA Y (DATA IN M_MEM_2) IS REGISTERED AT HIGHEST PRIORITY

ARITHMETIC PROCESSOR, INFORMATION PROCESSING DEVICE AND CONTROL METHOD OF ARITHMETIC PROCESSOR

This application is based upon and claims the benefit of priority of the prior Japanese Patent Application No. 2018-176307, filed on Sep. 20, 2018, the entire contents of which are incorporated herein by reference.

FIELD

The present invention relates to an arithmetic processor, an information processing device and a control method of the arithmetic processor.

BACKGROUND

An arithmetic processor, a processor or a CPU chip (hereafter called a processor) is accessibly connected to a main memory. Then the processor reads data from the main memory to execute instructions of a program, and writes the data, which is changed or generated by executing the instruction, to the main memory. Normally the main memory is a high-speed and large capacity dynamic random access memory (DRAM).

To virtually eliminate the access time to the main memory, the processor includes a cache memory. The processor stores or registers data read from the main memory in the cache memory, and thereafter the processor acquires the data to be acquired by accessing the memory from the cache memory.

The cache memory is disclosed in Patent Literature 1 (Japanese National Publication of International Patent Application No. 2004-503010) and Patent Literature 2 (Japanese Laid-open Patent Publication No. 2016-91242).

SUMMARY

Instead of a conventional high-speed large capacity DRAM, a wide-band DRAM called a hybrid memory cube (referred to as HMC hereinafter), of which time to load large capacity data at consecutive addresses is shorter than DRAM, has begun to be used. This HMC is constituted by DRAM chips which are three-dimensionally layered, the three-dimensionally layered DRAM chips and a host processor chip are connected via a wide bus, and the three-dimensionally layered DRAMs and the processor are housed in a same package.

Comparing with a conventional DRAM, HMC is characterized in that access time for random access or accessing a small capacity data is longer but access time is shorter when large capacity data at consecutive addresses is loaded. Thereby HMC is a wide-band DRAM.

However since the HMC and the processor are housed in a same package, the capacity of HMC is not as large as a conventional DRAM. Therefore as the main memory, the processor is assumed to use both HMC, which is a wide-band DRAM, and a conventional large capacity DRAM, and access to both main memories.

In the case where the processor is configured to access both the HMC, which is a wide-band DRAM, and the conventional large capacity DRAM, if large capacity data at consecutive addresses is loaded from the HMC, which is a wide-band DRAM, the data of the conventional large capacity DRAM in the cache memory is evicted and the cache memory is filled with the data of HMC. As a result, the cache memory frequently generates a cache miss when a load instruction of the data in the conventional large capacity DRAM data is executed, whereby memory access to the conventional large capacity DRAM frequently occurs, and memory access efficiency of the processor drops.

With the foregoing in view, it is an object of a first aspect of the present embodiment to provide an arithmetic processor, an information processing device and a control method of the arithmetic processor that suppresses the generation of a cache miss when the main memories having different characteristics are accessed.

An arithmetic processor, comprising: an arithmetic logical operation unit configured to execute an instruction; and a cache unit including a cache memory configured to store a part of data in a first main memory and a part of data in a second main memory which has a wider band than the first main memory when at least a predetermined capacity of data having consecutive addresses is accessed, and a cache control unit configured to read data in the cache memory responding to a memory request issued by the arithmetic logical operation unit and respond to the memory request source, wherein a ratio of capacity of the data in the second main memory with respect to the data in the first main memory stored in the cache memory is limited to a predetermined ratio or less.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a table that indicates the characteristics of the first main memory and the second main memory of this embodiment.

FIG. 15 is a diagram depicting a concrete example of the registration and the update of the eviction priority in FIG. 14.

DESCRIPTION OF EMBODIMENTS

Figure 1:
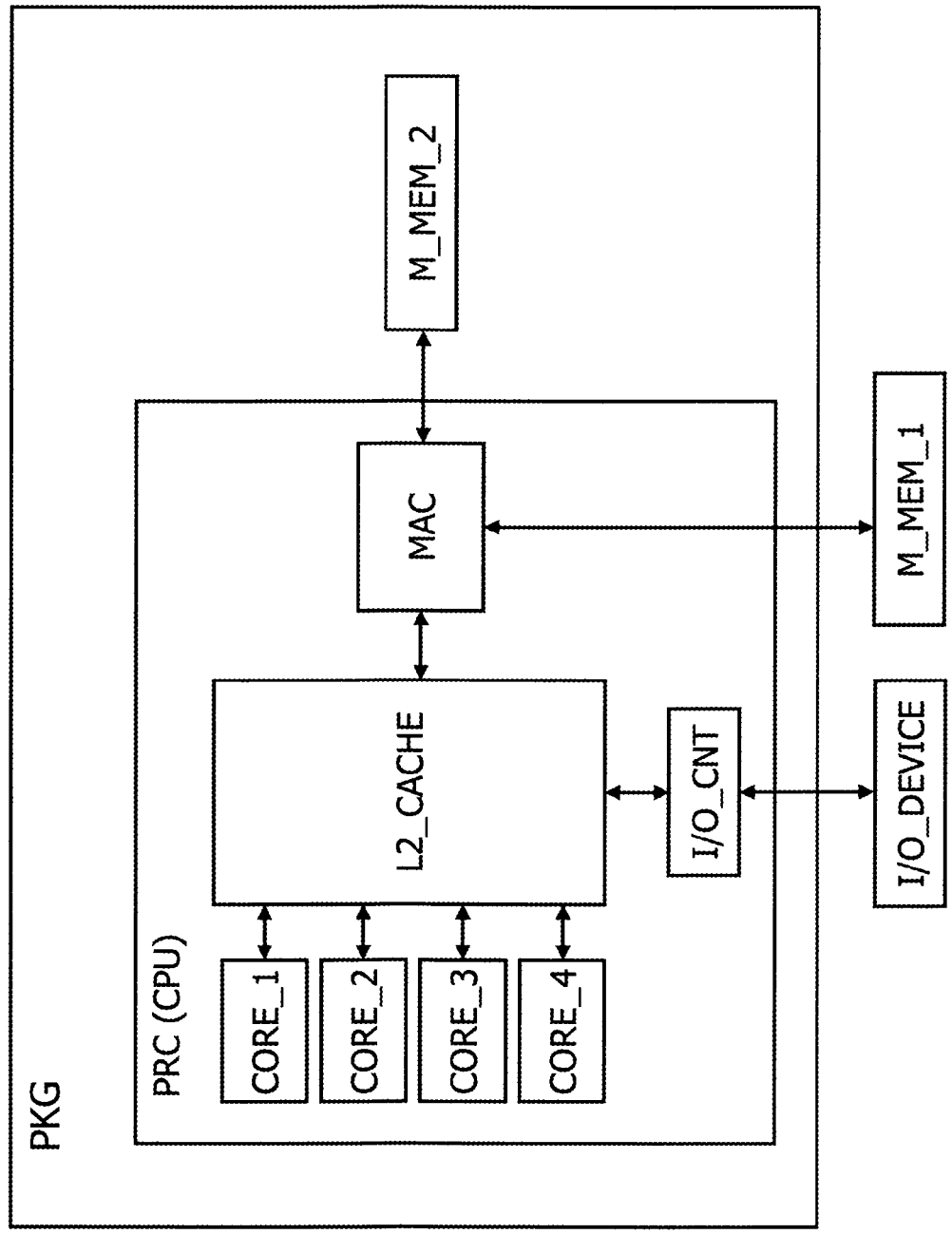
FIG. 1 is a diagram depicting a configuration example of an information processing device having a processor according to this embodiment.

FIG. 1 is a diagram depicting a configuration example of an information processing device having a processor according to this embodiment. The processor PRC, which is a CPU chip, is housed in a same package PKG along with a second main memory M_MEM_2, which is a wide-band memory. The processor PRC includes a plurality of cores CORE_1 to CORE_4, an L2 (level 2) cache unit L2_CACHE which is shared by the plurality of cores, a memory access control circuit MAC and an I/O control circuit I/O_CNT. Each of the plurality of cores includes an instruction issuing unit, an arithmetic logical unit (ALU) which executes an issued instruction, and an L1 cache respectively.

The processor PRC is accessibly connected to a first main memory M_MEM_1 and the second main memory M_MEM_2 which has a wider band than the first main memory when data, at consecutive addresses and having at least a predetermined capacity, is accessed. Responding to a memory request issued by an L2 cache unit L2_CACHE in the processor, the memory access control circuit MAC accesses the first main memory or the second main memory. The processor PRC is connected to an input/output device I/O_DEVICE (e.g. hard disk), inputs data from the input/output device via an I/O control circuit I/O_CNT, and outputs the data to the input/output device. The first main memory M_MEM_1 and the second main memory M_MEM_2 will be described later.

Figure 2:
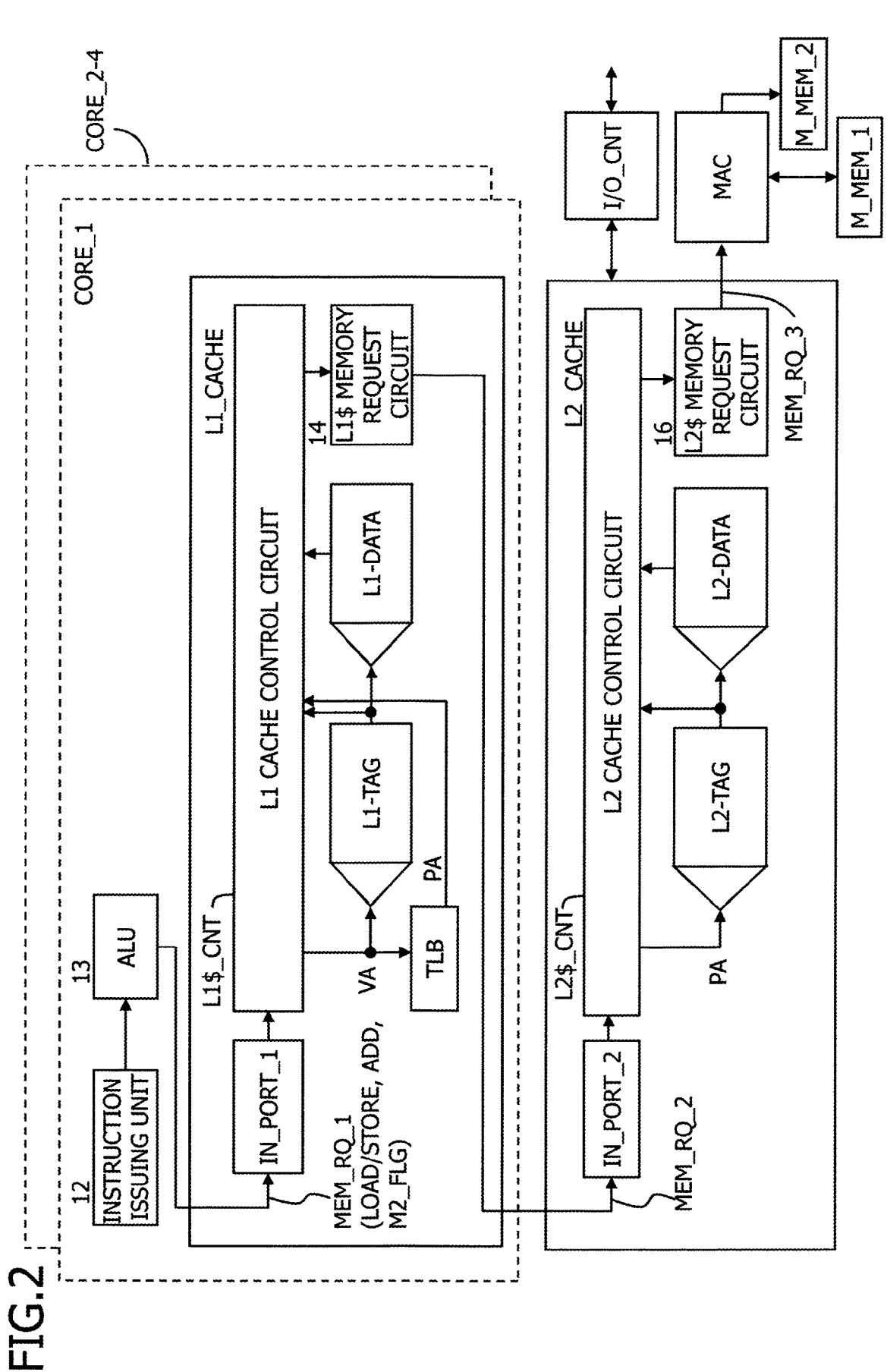
FIG. 2 is a diagram depicting a configuration example of the processor according to this embodiment.

FIG. 2 is a diagram depicting a configuration example of the processor according to this embodiment. As described in FIG. 1, each core CORE_1 to CORE_4 includes the instruction issuing unit 12 which fetches an instruction of the program from the main memory and issues the instruction, an arithmetic logical operation circuit (ALU) 13 which executes the issued instruction, and the level 1 cache unit L1_CACHE. Further, the processor includes the level 2 cache unit L2_CACHE shared by a plurality of cores, a memory access control circuit MAC, and an I/O control circuit I/O_CNT.

The L1 cache unit L1_CACHE includes: an input port IN_PORT_1, to which a memory request MEM_RQ_1, such as a load request and a store request, issued by the arithmetic logical operation circuit 13, is entered; and an L1 cache control circuit L1$_CNT which inputs the memory request in the input port and controls processing of the memory request. Further, the L1 cache unit includes a L1 cache memory including an L1 cache tag memory L1_TAG which stores tag information, and an L1 cache data memory L1_DATA which stores data, and a translation look-aside buffer TLB which converts a logical address (or virtual address) VA in the address of the memory request into a physical address PA. The L1 cache unit further includes an L1 cache memory request circuit 14 which issues a memory request MEM_RQ_2 to the L2 cache unit when a cache miss occurs in the L1 cache unit.

The L1 cache control circuit L1$_CNT has a pipeline configuration, and inputs a memory request MEM_RQ_1 in the input port IN_PORT_1, and converts a logical address VA of the address of the memory request to a physical address PA based on a TLB. The TLB is a cache memory that stores a part of the entries of the address conversion table stored in the main memory. When the physical address corresponding to the logical address VA is not detected in the TLB (TLB cache miss), the L1 cache control circuit issues a TLB data request to the L2 cache unit, updates the TLB with the TLB data acquired by the data response to the TLB data request, and executes the address conversion based on the updated TLB when the reissued memory request is reissued.

Further, the L1 cache control circuit searches the L1 cache tag memory L1_TAG using the index address of the address of the memory request, and determines whether this is the L1 cache hit or not by comparing the tag address in the L1_TAG and the tag address of the address of the memory request. When the comparison result is a match (a case of cache hit), the L1 cache control circuit responds with the data of the L1 cache data memory L1_DATA at the index address to the arithmetic logical operation circuit 13. In the case of a cache miss, the L1 cache control circuit causes the L1 cache memory request circuit 14 to issue the memory request MEM_RQ_2 to the L2 cache unit L2_CACHE.

The L2 cache unit L2_CACHE includes: an input port IN_PORT_2 to which a memory request MEM_RQ_2, issued by the L1 cache memory request circuit 14, is entered; and an L2 cache control circuit L2$_CNT which inputs the memory request in the input port and controls the processing of the memory request. Further, just like the L1 cache unit, the L2 cache unit includes the L2 cache memory including an L2 cache tag memory L2_TAG, and an L2 cache data memory L2_DATA. The L2 cache unit includes an L2 cache memory request circuit 16 which issues a memory request MEM_RQ_3 to the memory access control circuit MAC when a cache miss occurs in the L2 cache unit.

The operation of the L2 cache control circuit L2$_CNT in the L2 cache unit is the same as the above mentioned L1 cache control circuit L1$_CNT, except that address conversion processing is not performed. In the case of an L2 cache miss, the L2 cache control circuit causes the L2 cache memory request circuit 16 to issue a memory request to the memory access control circuit MAC, and thereafter, when the data response is received from the memory access control circuit MAC, the L2 cache memory request circuit 16 enters the cache registration request of the responded data to the input port IN_PORT_2. Then the L2 cache control circuit L2$_CNT inputs the cache registration request, registers the responded data and the tag information thereof to the L2 cache memory (L2_TAG, T2_DATA), and responds with the data to the L1 cache memory request circuit 14.

The L1 cache memory request circuit 14 in the L1 cache unit L1_CACHE enters the cache registration request in the responded data to the input port IN_PORT_1. Then the L1 cache control circuit L1$_CNT inputs this cache registration request, registers the responded data and the tag information thereof to the L1 cache memory (L1_TAG, T1_DATA), and responds with the data to the arithmetic logical operation circuit 13.

Figure 4:
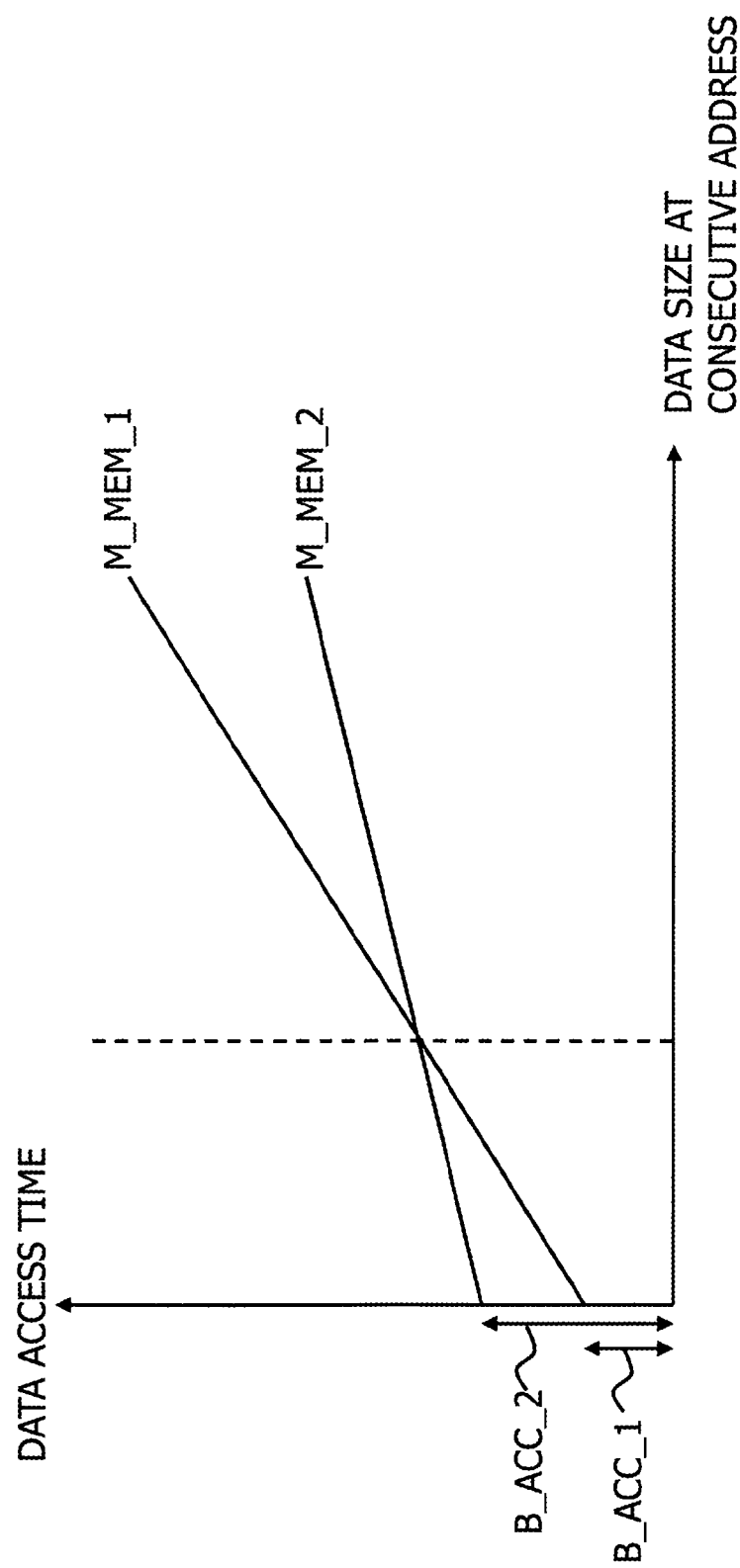
FIG. 4 is a graph depicting the characteristics of the access time of the first main memory and the second main memory with respect to the data size (capacity) in accessing data at consecutive addresses.

FIG. 3 is a table that indicates the characteristics of the first main memory and the second main memory of this embodiment. FIG. 4 is a graph depicting the characteristics of the access time of the first main memory and the second main memory with respect to the data size (capacity) in accessing data at consecutive addresses. The first main memory M_MEM_1 is a conventional DDR type DRAM. The second main memory M_MEM_2, on the other hand, is a memory, such as an HMC, which implements a wide-band memory when large sized data at consecutive addresses is accessed.

The first main memory, DRAM, is a memory module in which a plurality of DRAMs are modulated, and is a large capacity memory. The first main memory directly receives active commands, read commands and write commands for the DDR type DRAM from the memory access control circuit MAC in the processor, outputs the read data, and writes the write data. Therefore the basic access time B_ACC_1, which does not depend on the data size, out of the access time to the data at consecutive addresses, is short.

The second main memory, HMC, on the other hand, includes a plurality of three-dimensionally layered DRAM chips, and a logical circuit chip which corresponds to the memory access control circuit for the three-dimensional DRAM chips, and the processor is connected to the logical circuit chip via a wide bus. The memory capacity of the HMC, which is housed along with the processor in the same package, is smaller than that of the first main memory M_MEM_1. The processor accesses the three-dimensional DRAM chips of the HMC via the logical circuit chip, hence the basic access time B_ACC_2 is longer than that of the first main memory M_MEM_1. In other words, the processor and the logical circuit chip perform the read request, the write request (with write data), and the read response (with read data) based on a specific packet communication protocol, and the logical circuit chip and the three-dimensional DRAM chips of the HMC perform memory access using an active command, a read command or a write command, for example.

When the data size becomes a predetermined data size or more, however, access time to the data at the consecutive addresses is shorter in the second main memory M_MEM_2 than in the first main memory M_MEM_1. The data access time of random address access, on the other hand, is shorter in the first main memory M_MEM_1 than in the second main memory M_MEM_2.

As mentioned above, the memory capacity of the second main memory, such as HMC, is small, hence the processor uses both the first main memory, such as a conventional large capacity DRAM memory module, and the wide-band second main memory that is wide-band, for accessing large memory size data at consecutive addresses.

According to the above mentioned characteristics of the first main memory and the second main memory, the program executed by the processor specifies such that the large capacity data at consecutive addresses is stored in the wide-band second main memory such as HMC, and small capacity data at consecutive addresses and data at random addresses are stored in a memory module of the conventional DRAM. For example, a memory flag, which specifies the distinction of the first or second main memory, is often attached to a load instruction or a store instruction. If the memory flag of the load instruction or the store instruction is enabled "1", for example, this indicates that the data is data to be stored in the second main memory, namely HMC.

However, the size of the cache memory in the processor, particularly the size of the L2 cache memory, which is the last level cache (LLC), is limited, and if a load instruction for data that equals or exceeds a predetermined data size is issued to the second main memory such as HMC, large capacity data of the second main memory is accessed and registered in the L2 cache memory, and all data registered in the L2 cache memory may be evicted. As a result, when the arithmetic logical operation circuit ALU accesses the data in the first main memory M_MEM_1 thereafter, a cache miss occurs in the L2 cache memory, and the first main memory must be accessed for all memory accesses, which drops performance of the cache memory.

Embodiment 1

Figure 5:
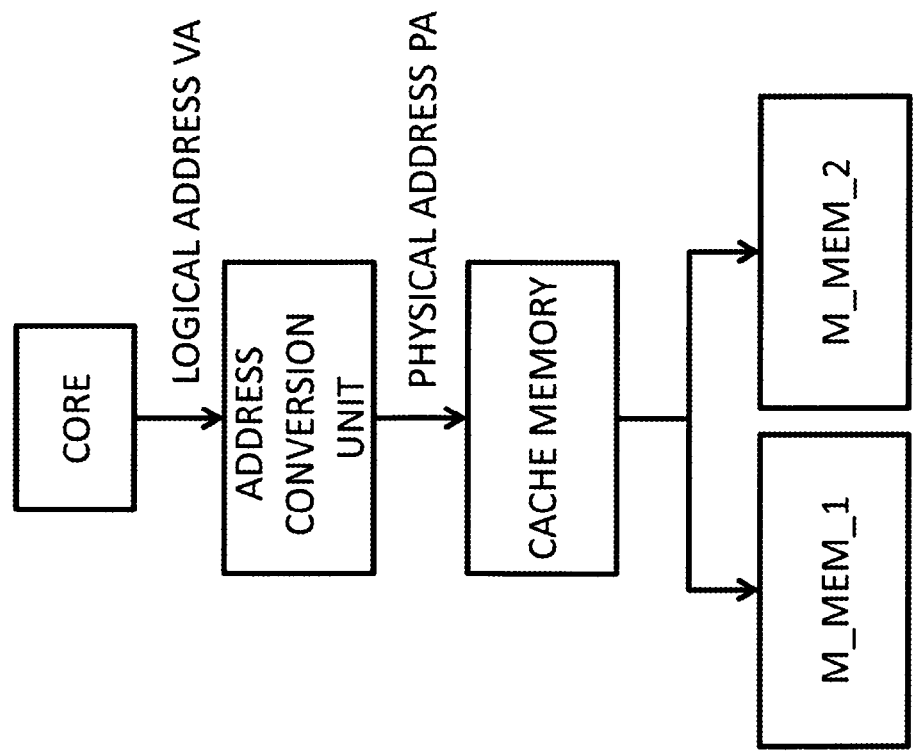
FIG. 5 is a diagram depicting a relationship among the core, the address conversion unit and the cache memory in the processor, and two types of main memories connected to the processor.

FIG. 5 is a diagram depicting a relationship among the core, the address conversion unit and the cache memory in the processor, and two types of main memories connected to the processor. As described above, the arithmetic logical operation circuit in the core issues a memory request to the L1 cache unit, and the L1 cache unit converts the logical address VA of the memory request into the physical address PA based on the TLB and the data conversion table in the main memory, and determines a cache hit or cache miss by comparing the physical address PA and the tag address in the cache tag memory. The cache memory stores the data in the first main memory M_MEM_1 and the second main memory M_MEM_2, and if a cache hit occurred, the data in the cache memory is read and responded to the request source, and if a cache miss occurred, the first main memory or the second main memory is accessed according to the access destination address of the memory request.

Figure 6:
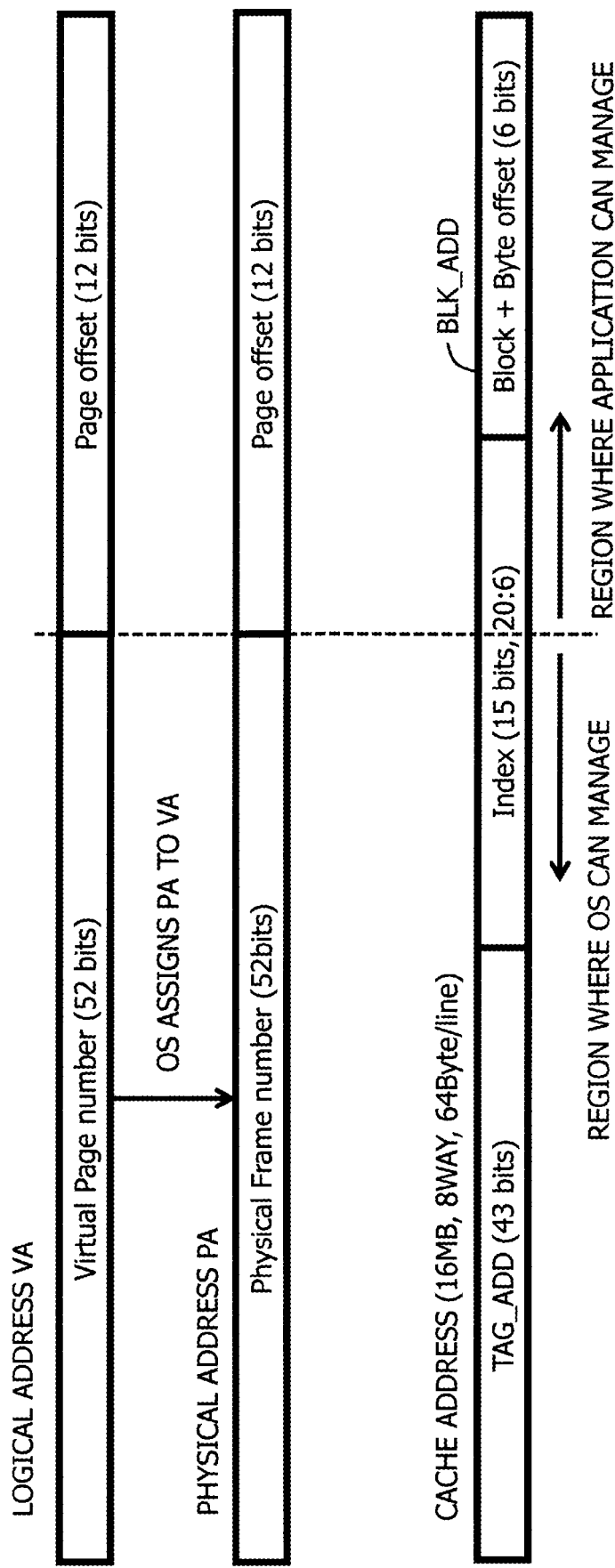
FIG. 6 is a diagram depicting an example of the relationship of the logical address, the physical address and the address of the cache memory.

FIG. 6 is a diagram depicting an example of the relationship of the logical address, the physical address and the address of the cache memory. According to the example in FIG. 6, the memory space of the processor is the space of the 64-bit logical address VA, of which lower 12 bits are assigned to the address of one page, and the higher 52 bits are assigned to the logical page number.

Meanwhile, in the physical address PA converted from the logical address VA, the lower 12 bits, which are page offset, are the same as page offset of the logical address VA, and the higher 52 bits are the physical address that the OS assigns to the higher 52 bits of the logical address VA. When the above mentioned L1 cache unit converts the logical address of the memory request into the physical address, a page fault is generated and a CPU interrupt is generated if a TLB miss occurs, and no entry of the address conversion table exists in the main memory. Because of this CPU interrupt, the OS assigns the higher 52 bits of the physical address PA to the higher 52 bits of the logical address VA, and registers this entry, including the higher 52 bits of the physical address PA and the logical address VA, in the address conversion table in the main memory.

FIG. 6 indicates a configuration example of the cache address, along with the logical address VA and the physical address PA. In the cache address in this example, the lower 6 bits indicate the address BLK_ADD in the cache line (cache block), the middle 15 bits indicate the index address Index, and the higher 43 bits indicate the tag address TAG_ADD stored in the cache tag. Therefore the index address Index of the cache is included in a part of the higher 52 bits of the physical address PA, which the OS assigns to the higher 52 bits of the logical address VA.

In the example of the cache address in FIG. 6, the cache memory has the following features: a total capacity of 16 MB; one cache line size of 64 bytes; an eight-way (a number of ways is $2^3$); and a number of entries that are selected by the index is $2^{15}/2^3=2^{12}=4048$.

In Embodiment 1, when the OS assigns the higher 52 bits of the physical address PA to the higher 52 bits of the logical address VA in the above relationship, the index address is divided at a predetermined ratio, and one of the divided index addresses is assigned to the address of the data of a first main memory, and the other divided index address is assigned to the address of the second main memory. Thereby the data in the second main memory can be registered in the predetermined ratio of the cache lines of the cache memory, and the data in the first main memory can be registered in the rest of the cache linens of the cache memory.

Thus the cache memory can be divided into a region for the data in the first main memory, and a region for the data in the second main memory, so as to prevent the filling of the cache memory with a large volume of data in the second main memory, and to suppress the frequent generation of a cache miss when data in the first main memory is requested.

Figure 7:
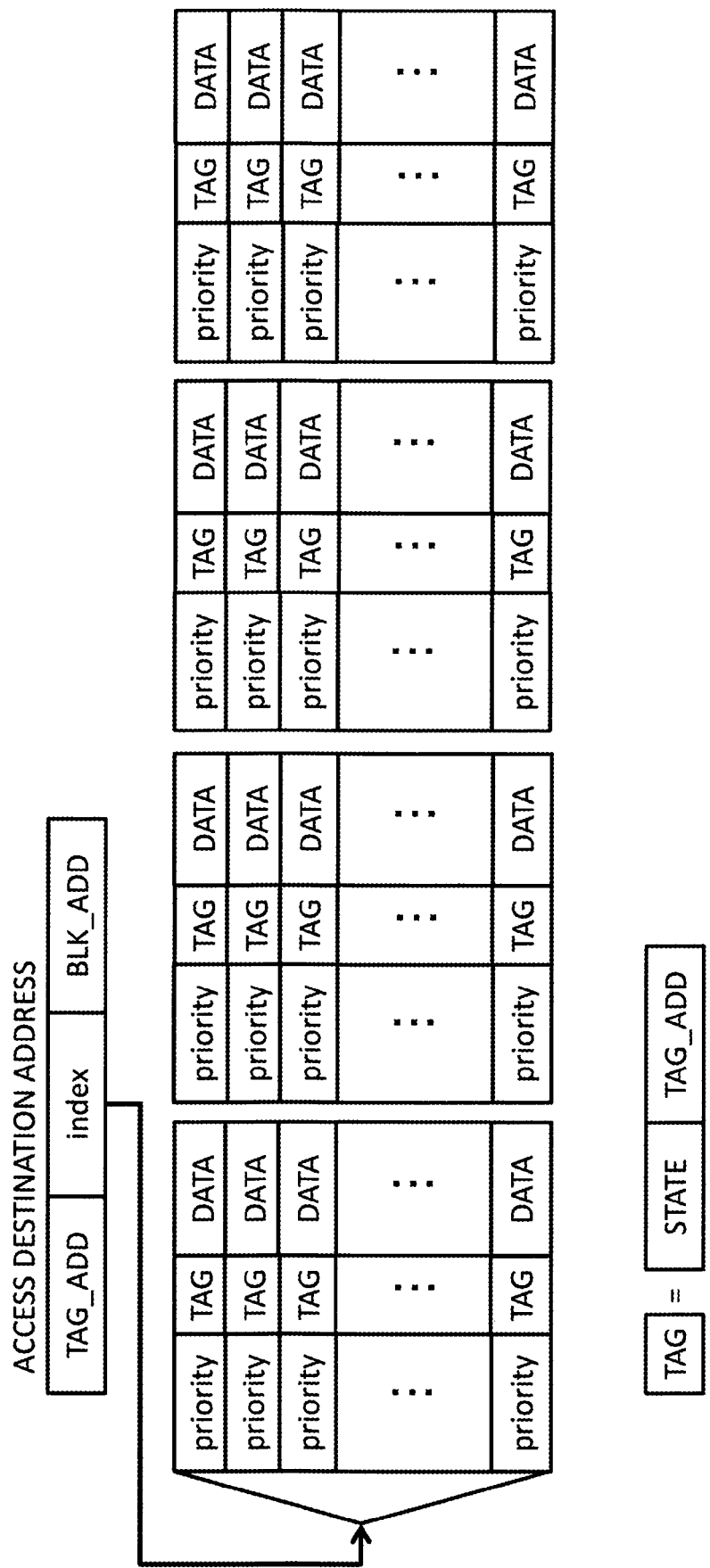
FIG. 7 is a diagram depicting a configuration example of a set-associative cache.

FIG. 7 is a diagram depicting a configuration example of a set-associative cache. This cache is an example of a four-way set associative. The access destination address of a memory request has, as described in FIG. 6, the TAG address TAG_ADD, the index address Index, and the address in the cache block BLK_ADD in descending order. The lower 2 bits of the index address Index is an address to distinguish four (four-way) cache lines.

The cache control circuit searches a cache memory using the index address Index (excluding the lower 2 bits that identifies the four-way set-associative) of the access destination address, and determines cache hit or cache miss by determining whether there is a cache line having a tag address that matches with the tag address TAG_ADD of the access destination address, out of the tag addresses TAG_ADD in the tags of four cache lines (four-way set-associative) specified by the index address (excluding the lower 2 bits). Here the tag address TAG_ADD includes the 2 bits to specify the way number.

Therefore a number of cache lines of the set-associative cache in FIG. 7 in the vertical direction is a number that can be selected by the index address (excluding the lower 2 bits). In Embodiment 1, when the logical address is converted to the physical address, a page fault is generated if the physical address corresponding to the logical address is not assigned in the address conversion table, and in the page fault, the OS assigns the physical address by a CPU interrupt. When the OS assigns a physical address to the logical address, OS assigns index address having 00, 01 and 10 in the higher 2 bits of the index address are assigned to the data in the first main memory, and index address having 11 in the higher 2 bits is assigned to the data in the second main memory, for example.

Figure 8:
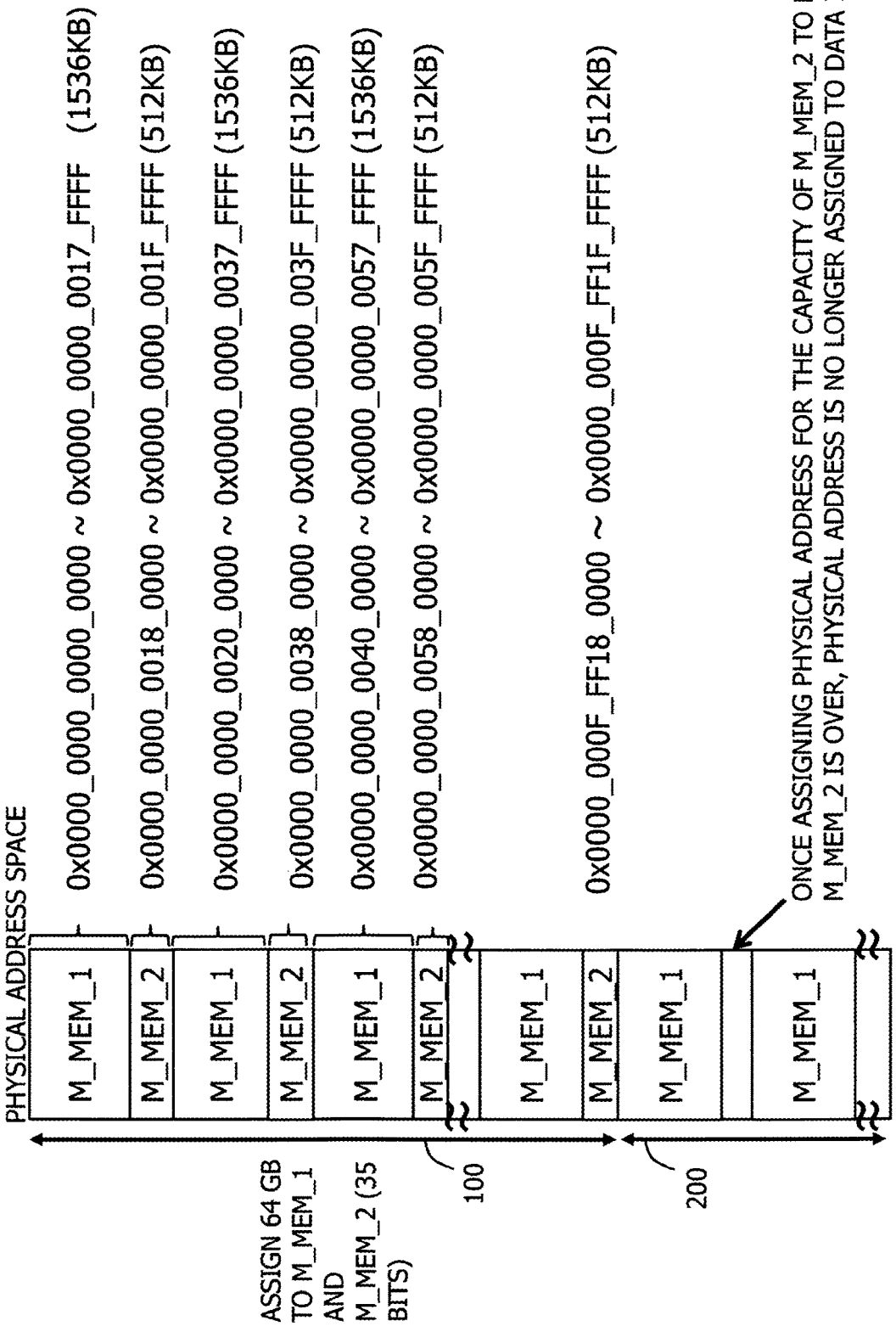
FIG. 8 is a diagram depicting an example of assigning a physical address to the data in the first main memory and the data in the second main memory by the OS.

As a result, in the L2 cache memory, which is the last level cache (LLC), the data in the first main memory is registered in the region of the cache memory of which the higher 2 bits of the index address are 00, 01 and 10, and the data in the second main memory is registered in the region of the cache memory of which higher 2 bits of the index address are 11, for example. Thereby the data of the first main memory is cache-registered in a 3/4 region of the L2 cache memory, and the data in the second main memory is cache-registered in a 1/4 region of the L2 cache memory. In this case, 1/4 is the predetermined ratio dividing the cache memory FIG. 8 is a diagram depicting an example of assigning a physical address to the data in the first main memory and the data in the second main memory by the OS. FIG. 8 indicates the physical address spaces assigned to the first main memory M_MEM_1 and the second main memory M_MEM_2, and the range of each physical address. In this example, the capacity of the second main memory M_MEM_2 is 16 GB. The capacity of the physical address space 100 is 64 GB. The OS assigns the first 1536 KB of the physical address space to the data in the first main memory M_MEM_1, and the next 512 KB to the data in the second main memory M_MEM_2. In the same manner, the OS assigns the next 1536 KB of the physical address space to the data of the first main memory M_MEM_1, and the next 512 KB to the data in the second main memory M_MEM_2. Hereafter, the OS assigns the physical address space in the same manner until all 16 GB in the second main memory is assigned. The first 1536 KB of the physical address space is a space where the higher 2 bits of the index address Index of the cache are 00, 01 and 10. The next 512 KB of the physical address space is a space where the higher 2 bits of the index address Index are 11. The higher 2 bits of the index address are [20:19] of the index address [20:6] in the physical address [63:0].

Thereby the data in the first main memory is assigned to the 3/4 region of the physical address space 100, and the data in the second main memory is assigned to the 1/4 region of the physical address space 100.

In the space 200 other than the physical address space 100, the OS assigns the first 1536 KB to the data in the first main memory M_MEM_1, and does not assign the next 512 KB to any data of any main memory.

Figure 9:
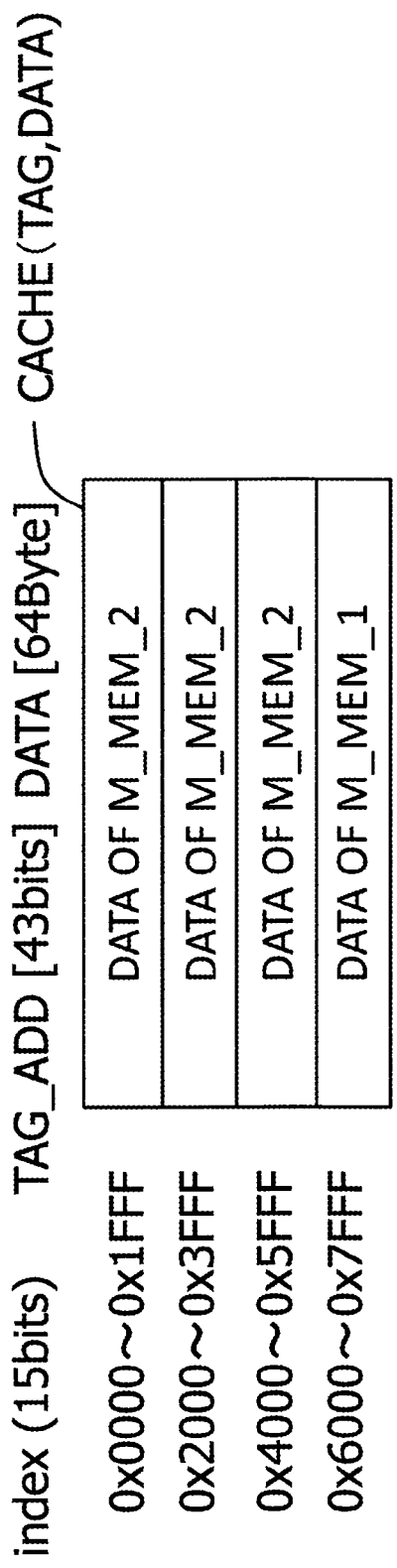
FIG. 9 is a diagram depicting the regions of the data in the first and the second main memories assigned to the cache memory and the index addresses thereof according to Embodiment 1.

FIG. 9 is a diagram depicting the regions of the data in the first and the second main memories assigned to the cache memory and the index addresses thereof according to Embodiment 1. In the cache memory CACHE, the data in the first main memory is registered to the first three regions out of the four regions equally divided by the higher 2 bits of the index address, and the data in the second main memory is registered to the remaining one region. The ranges of the index addresses corresponding to the four regions are indicated on the left of FIG. 9. According to this, the higher 2 bits of the index (15 bits) of the last one region are 11. This means that the higher 4 bits of 0x6000, 0x7FFF are 0110, 0111.

Figure 10:
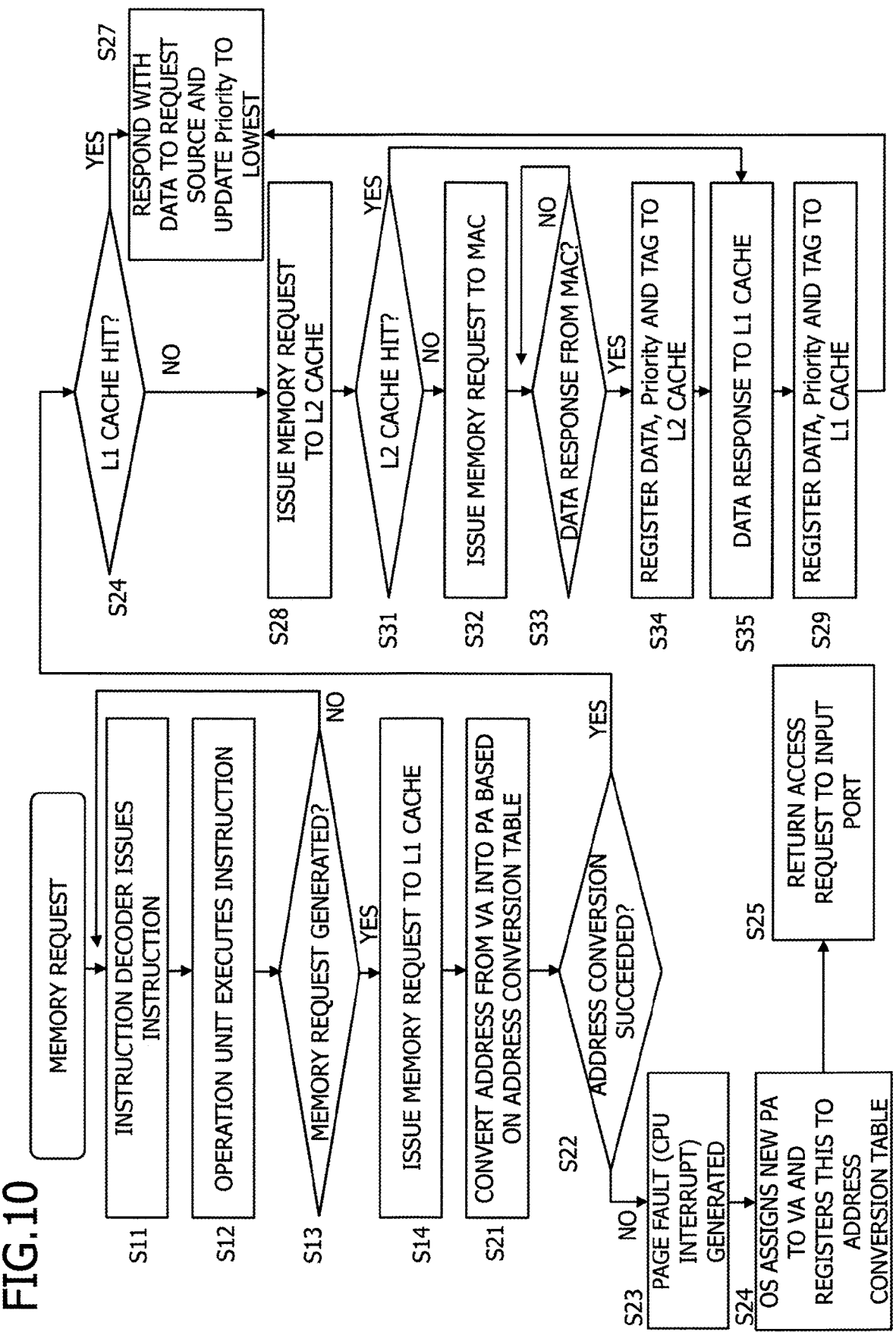
FIG. 10 is a flow chart depicting a processing of a memory request by the cache unit according to Embodiment 1.

FIG. 10 is a flow chart depicting a processing of a memory request by the cache unit according to Embodiment 1. First the instruction decoder in the core issues an instruction (S11). When the arithmetic logical operation unit executes the instruction (S12) and a memory request is generated (YES in S13), the operation unit issues the memory request to the L1 cache unit (S14).

Then based on an address conversion table, the L1 cache unit converts the logical address VA of the memory request to the physical address PA (S21). The address conversion is performed based on the TLB, and the logical address VA is converted into the physical address PA in the case of a TLB hit, but in the case of a TLB miss, the L1 cache unit issues a TLB request to the L2 cache unit, and when the TLB response is received from the L2 cache unit, the L1 cache unit registers this TLB and returns the memory request to the input port.

If the physical address PA corresponding to the logical address VA is not registered in the main memory, however, address conversion fails (NO in S22). In this case, a page fault occurs, and a CPU interrupt is generated (S23). Responding to this CPU interrupt, the OS assigns a new physical address PA corresponding to the logical address VA, and registers this physical address PA in the address conversion table (S24). Then the access request is returned to the input port (S25). Next the L1 cache unit inputs the memory access request again, and executes the address conversion based on the address conversion table (S21).

When the OS assigns the physical address corresponding to the logical address by the CPU interrupt due to the page fault, the OS assigns the logical address to the data in the first main memory M_MEM_1 and the data in the second main memory M_MEM_2 based on the assignment of the physical address space in FIG. 8. The OS can determine whether the data is the data of the first main memory M_MEM_1 or the data in the second main memory M_MEM_2 by referring to the memory flag M2_FLG attached to the instruction, which indicates whether or not the data is the data in a second main memory. As mentioned above, the memory flag M2_FLG, which indicates whether or not the data is data to be stored in the second main memory M_MEM_2, is attached to the instruction in the program, and the memory flag M2_FLG is also attached to the memory request.

Referring to FIG. 10 again, the L1 cache control circuit L1$_CNT of the L1 cache unit determines a L1 cache hit or miss by searching the L1 cache tag memory L1_TAG (S24). In the case of the L1 cache hit (YES in S24), the L1 cache control circuit L1$_CNT responds with the data to the request source of the memory request (operation unit), and updates the eviction priority Priority of this cache line to be the lowest (S27). In the case of the cache miss (NO in S24), on the other hand, the L1 cache memory request circuit 14 issues the memory request to the L2 cache unit (S28).

The L2 cache control circuit L2$_CNT determines an L2 cache hit or miss, and in the case of the L2 cache hit (YES in S31), the L2 cache control circuit L2$_CNT responds with the data to the L1 cache memory request circuit 14 of the L1 cache unit (S35). In the case of L2 cache miss (NO in S31), on the other hand, the L2 cache memory request circuit 16 issues the memory request to the memory access control circuit MAC (S32). Then when the memory access control circuit MAC receives data from the main memory and responds with the data to the L2 cache memory request circuit 16 (YES in S33), the L2 cache memory request circuit 16 registers the responded data and TAG information in the L2 cache (L2 tag memory, L2 data memory) at the lower eviction priority Priority (S34), and responds with data to the L1 cache memory request circuit 14 of the L1 cache unit (S35).

Responding to this, the L1 cache memory request circuit 14 registers the responded data and the tag information thereof to the L1 cache (L1 tag memory, L1 data memory), at the lowest eviction priority Priority (S29), and responds with data to the request source (operation unit) of the memory request (S27). In this case, the eviction priority Priority is not updated in S27.

When a logical address is converted into a physical address, if the physical address corresponding to the logical address is not yet assigned, a page default occurs, as mentioned above, and the OS assigns the physical address to the logical address by the CPU interrupt. At this time, the OS assigns the physical address to the logical address based on the assignment of the physical address space in FIG. 8. As a result, to the logical address of the data in the first main memory, the physical address having an index address of which higher 2 bits are 00, 01 or 10 is assigned, and to the logical address of the data in the second main memory, the physical address having an index address of which higher 2 bits are 11 is assigned.

As a result, as illustrated in FIG. 9, the data in the second main memory is stored in ¼ of the region of the cache memory, and the data in the first main memory is stored in ¾ of the region of the cache memory. Therefore in the case where data having a large memory size in the second main memory is loaded, the loaded data is stored in the limited cache lines at the index address of which higher 2 bits in the cache memory are 11, whereby eviction of all the data in the first main memory from the cache memory can be prevented.

Figure 11:
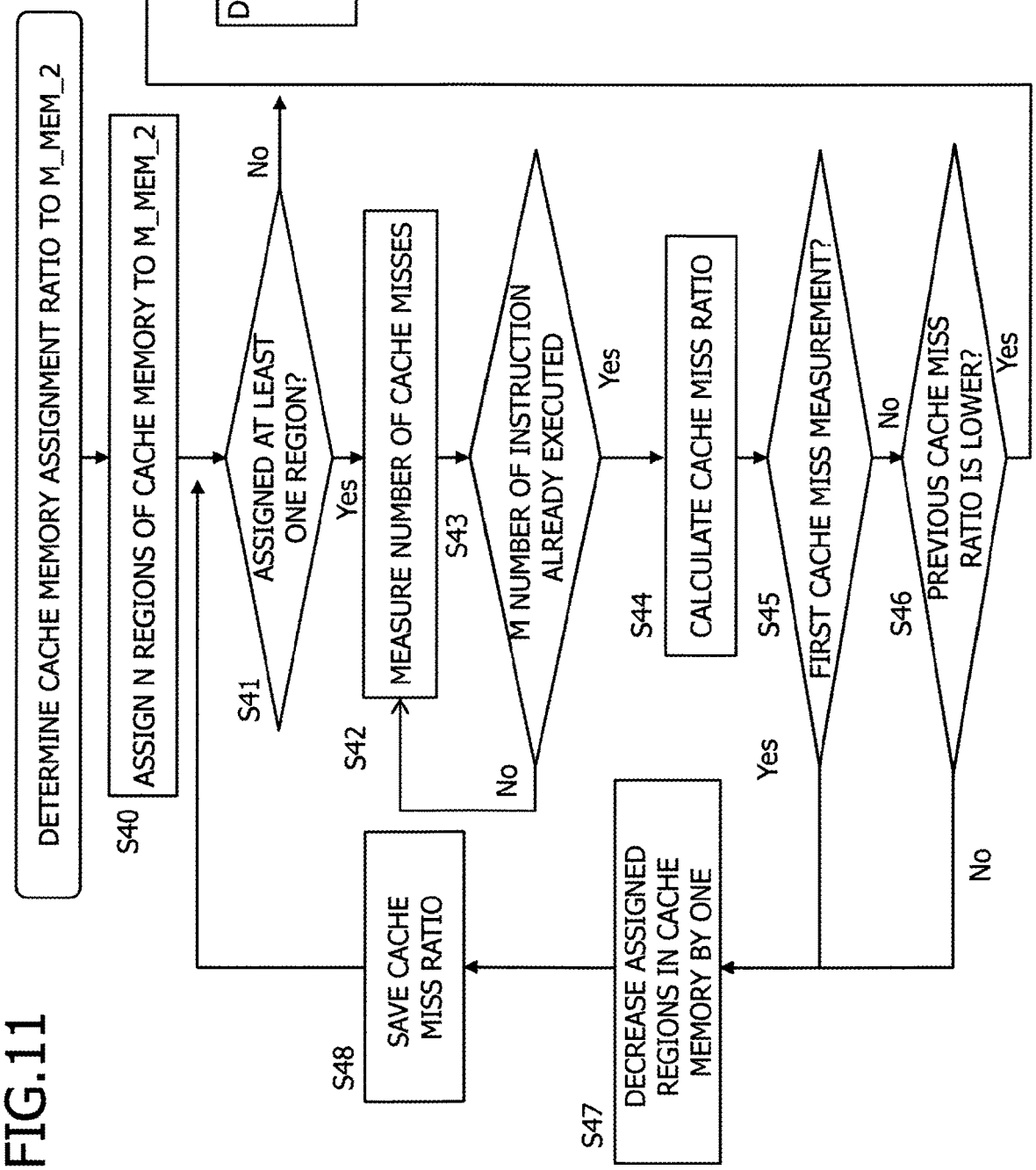
FIG. 11 is a flow chart depicting a determination processing to determine a cache memory assignment ratio of the second main memory.

FIG. 11 is a flow chart depicting a determination processing to determine a cache memory assignment ratio of the second main memory. This determination processing is performed when program execution is started in the production environment, for example, and is executed in parallel with the execution of the program. This determination processing is executed by the OS, for example.

First, the OS sets a physical address space to assign N number of regions (for example N is 8 or less), each of which has ⅛ of the cache memory, for the data in the second main memory M_MEM_2 (S40). The N number of regions means all divided ⅛ regions. The OS measures a number of cache misses (S42) while executing M number of instructions of the program (S43). The cache memory here is the L2 cache memory, which is an LLC, as mentioned above, and the number of cache misses here may be measured by the counter disposed in the L2 cache unit.

After executing M number of instructions of the program, the OS calculates the cache miss ratio (S44), and if this is the first cache miss measurement (YES in S45), the OS decreases the number of 1/8 regions to be assigned to the second main memory M_MEM_2 of the cache memory by one (S47), and saves the measured number of cache misses (S48).

Further, the OS measures a number of cache misses (S42) while executing M number of instructions of the program (S43) again, then after executing the M number of instructions, the OS calculates the cache miss ratio (S44), and determines whether or not the previous cache miss ratio is lower (S46) than the currently calculated cache miss ratio. The OS repeats this determination until a number of assigned 1/8 regions, each of which has a 1/8 ratio, becomes 0 (NO in S41), or the previous cache miss ratio becomes lower than the currently calculated cache miss ratio (YES in S46). When S41 becomes NO or S46 becomes YES, the OS determines a number generated, by adding one to a current number of 1/8 regions assigned to the second main memory in the cache memory, as the number of 1/8 regions assigned to the second main memory (S49).

Once a number of assigned regions to the second main memory (assignment ratio) in the cache memory is determined, the OS assigns the physical addresses having the index addresses so that the region of the cache memory where the data of the second main memory is registered is in the determined optimum assignment ratio, to the logical addresses of the data in the second main memory, and continues execution of the rest of the instructions of the program.

According to the example in FIG. 11, the OS determines the assignment ratio of which cache miss ratio of the cache memory is low (minimum value) under the production environment of the program, and assigns the physical address to the logical address so that the region of the cache memory for the data of the second main memory becomes the determined assignment ratio, therefore the cache miss ratio for the data in the first and second main memories of the cache memory, during execution of the remaining instructions of the program, can be minimized.

Various methods are possible as the methods of determining the cache memory assignment ratio of the data in the second main memory. For example, under the test environment immediately before the program is used in the production environment, the flow in FIG. 11 may be executed to determine the optimum assignment ratio.

Embodiment 2

In Embodiment 1, the OS assigns the physical address having a specific index address to the data in the second main memory, whereby the ratio of the capacity of the data in the second main memory in the cache memory, with respect to the data in the first memory to be stored in the cache memory, is limited to a predetermined ratio or less.

In Embodiment 2, on the other hand, the above ratio is limited to the predetermined ratio or less using the eviction priority, which is referred to in the eviction processing of the data of the cache line during data registration, when the cache control circuit registers data in the cache memory.

The set-associative cache memory illustrated in FIG. 7 has a plurality of cache lines (4 cache lines) in the same index, and this number of cache lines is the same as the number of ways. When data is registered to the cache memory, the cache control circuit evicts the data on a cache line having the highest eviction priority, out of the plurality of cache lines belonging to the same index, and registers the new data and the tag information to this cache line at the lowest eviction priority Priority. Further, when a cache hit occurs to a memory request, the cache control unit updates the eviction priority of the cache unit data to the lowest priority. The eviction priority is based on, for example, the least recently used (LRU) or the least frequently used (LFU).

In Embodiment 2, the cache control circuit registers the data at the highest eviction priority when the data in the second main memory is registered in the cache, and does not change the eviction priority at the highest priority when a cache hit occurs to the data in the second main memory later. As a result of this processing, in the four-way set-associative cache memory in FIG. 7, the capacity ratio of the data in the second main memory is limited to at most 1/4. Because, when the data in the second memory is registered to the cache, the data in the second main memory always becomes the eviction target. Hence the data in the second main memory is registered only to one cache line at the most, out of the four cache lines having the same index.

Figure 12:
FIG. 12 is a flow chart depicting common data registration in the case of a cache miss and update processing of the eviction priority in the case of a cache hit.

FIG. 12 is a flow chart depicting common data registration in the case of a cache miss and update processing of the eviction priority in the case of a cache hit. In the data registration to the cache memory in the case of a cache miss, which is indicated on the left side of FIG. 12, if a data registration request is inputted (YES in S50), for example, the L2 cache control circuit in the L2 cache unit searches the L2 cache tag memory L2_TAG using the index address in the physical address of the data, and determines whether there is a space in the plurality of cache lines corresponding to the index (S52). If there is no space in the plurality of cache lines (NO in S52), the L2 cache control circuit evicts the data in the cache line having the highest eviction priority Priority (LRU or LFU that is the least recently used or the least frequently used) out of the plurality of cache lines at the same index, and writes the evicted data back to the main memory (S53). Then, the L2 cache control circuit registers the registration target data and the tag information thereof to the cache line from which the data was evicted, at the lowest eviction priority (MRU or MFU, that is, the most recently used or the most frequently used).

In the update processing of the eviction priority in the case of a cache hit, which is indicated on the right side of FIG. 12, the L2 cache control circuit updates the eviction priority of the cache line to which a cache hit occurs to the lowest priority (MRU or MFU, that is, the most recently used or the most frequently used) (S55).

Figure 13:
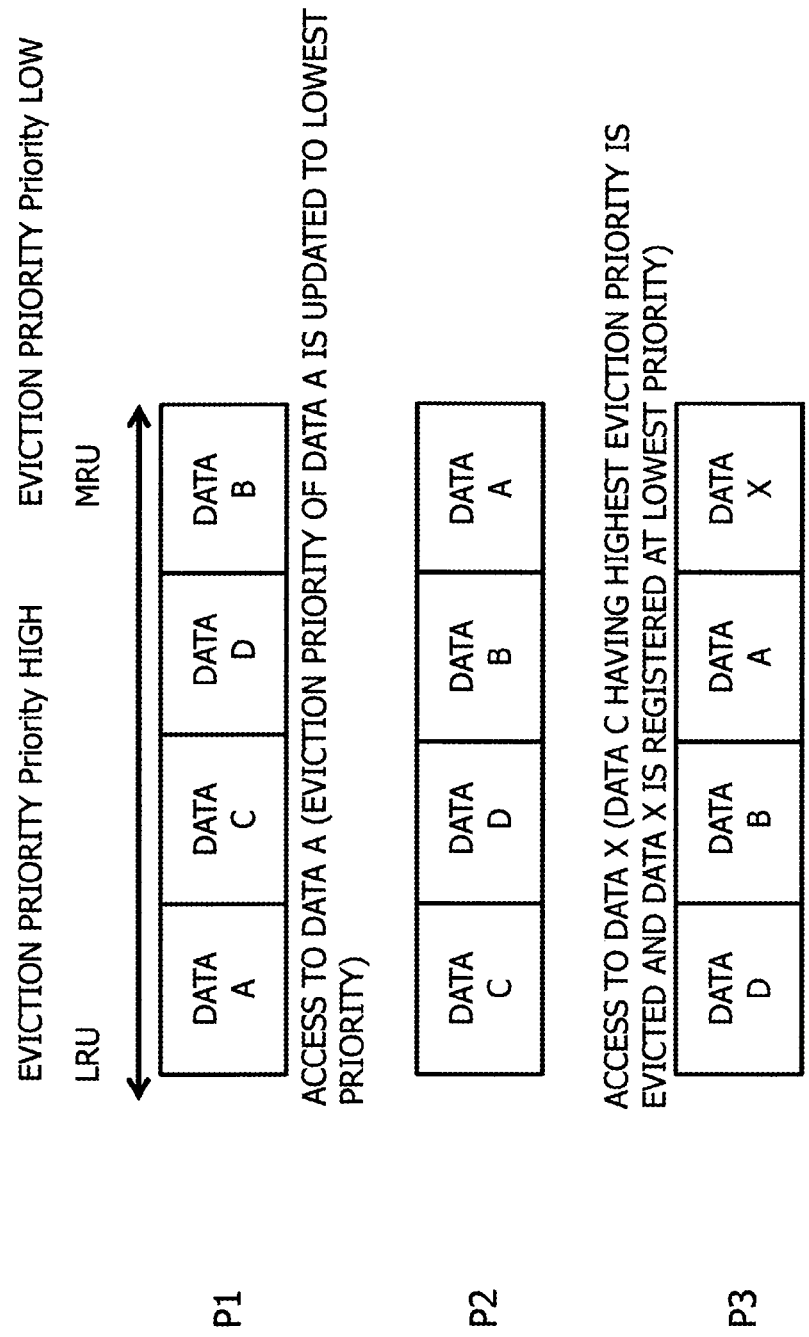
FIG. 13 is a diagram depicting a concrete example of the registration and the update of the eviction priority in FIG. 12.

FIG. 13 is a diagram depicting a concrete example of the registration and the update of the eviction priority in FIG. 12. This is an example when the eviction priority is LRU, and the left side of the diagram in the horizontal direction indicates that the eviction priority is highest (LRU), and the right side indicates that the eviction priority is lowest (MRU). In state P1, the eviction priority is higher in the sequence of the data A, C, D and B. If data A is accessed in this state P1, a cache hit occurs and the eviction priority of data A is updated to the lowest, and the eviction priorities of the other data C, D and B increase by one respectively.

Further, if data X is accessed in the state P2, a cache miss occurs, the data C, of which eviction priority is highest, is evicted from the cache line, and the data X is registered at the lowest eviction priority. As a result, the eviction priorities of data D, B and A increase by one respectively.

Figure 14:
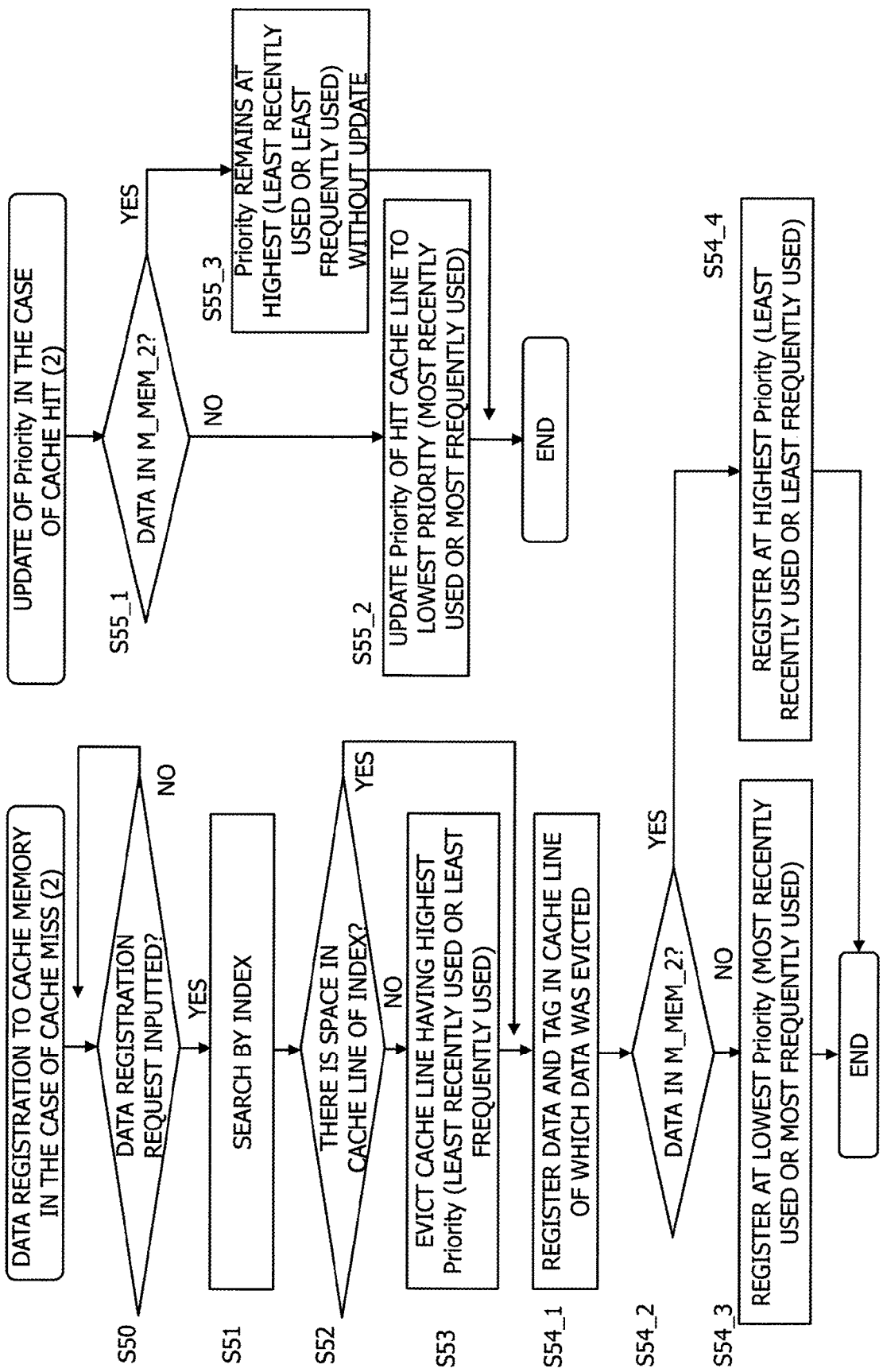
FIG. 14 is a flow chart depicting data registration in the case of a cache miss, and the update processing of the eviction priority in the case of a cache hit according to Embodiment 2.

FIG. 14 is a flow chart depicting data registration in the case of a cache miss, and the update processing of the eviction priority in the case of a cache hit according to Embodiment 2. In the data registration to the cache memory in the case of a cache miss, which is indicated on the left side of FIG. 14, the L2 cache control circuit in the L2 cache unit, for example, executes the processing S50 to S53 which are the same as FIG. 12. However, in this case, the L2 cache control circuit registers the data to a cache line from which data was evicted or a cache line that is open (S54_1), and the next processing is performed during registration of the eviction priority for the registered cache line.

In other words, in the case where the data to be registered to the cache is the data in the second main memory M_MEM_2 (NO in S54_2), the L2 cache control circuit registers this data at the highest eviction priority Priority (LRU or LFU, that is, the least recently used or the least frequently used) (S54_4). In the case where the data to be registered to the cache is the data in the first main memory M_MEM_1 (NO in S54_2), on the other hand, the L2 cache control circuit registers this data at the lowest eviction priority Priority (MRU or MFU, the most recently used or the most frequently used) (S54_3). Whether or not the data to be registered to the cache memory is the data in the second main memory can be determined by the memory flag M2_FLG attached to the memory request.

In the update processing of the eviction priority in the case of a cache hit, which is indicated on the right side of FIG. 14, the L2 cache control circuit does not update the eviction priority of the cache line to which a cache hit occurs, if the hit data is the data in the second main memory M_MEM_2 (S55_1 is YES, S55_3). Thereby the eviction priority of the data in the second main memory M_MEM_2 is maintained at the highest priority (LRU or LFU, that is, the least recently used or the least frequently used). If the hit data is the data in the first main memory M_MEM_1 (S55_1 is NO), on the other hand, the L2 cache control circuit updates the eviction priority of the hit cache line to the lowest priority (MRU or MFU, the most recently used or the most frequently used) (S55_2).

FIG. 15 is a diagram depicting a concrete example of the registration and the update of the eviction priority in FIG. 14. In the state P1, the data A, C, D and B are registered in the four (four-way) cache lines in the sequence of the eviction priority, and all of this data is assumed to be data in the first main memory M_MEM_1. If data X in the second main memory M_MEM_2 is accessed in this state P1, the L2 cache control circuit detects a cache miss, evicts the data A of which eviction priority is highest (LRU), and registers the data X at the highest eviction priority. As a result, the state P1 is updated to state P2. If the data X is accessed the next time, a cache hit occurs, and the L2 cache control circuit does not update the eviction priority of the data X, which remains the highest. This is the state P3.

If data Y in the second main memory is accessed here, a cache miss occurs, and the data X, of which eviction priority is the highest, is evicted, and the data Y is registered at the highest eviction priority in the cache line from which data X was evicted. This is the state P4.

As described above, in Embodiment 2, the data X in the second main memory is set at the highest eviction priority in both cases, when both data X is registered to the cache and when the cache hit occurs, hence the data X in the second main memory is always evicted when the data in the second main memory is registered thereafter. Also, the data X in the second main memory is evicted due to the highest priority when the data in the first main memory is registered in case of the cache miss. This means that the data in the second main memory is registered only in a single line, out of the plurality of cache lines in the same index. As a result, when a number of ways is four, the data in the second main memory is registered at most to ¼ the capacity in the cache memory. Therefore when a large volume of data is loaded or stored at consecutive addresses in the second main memory, all data in the first main memory in the cache memory is not evicted, and the frequent occurrence of a cache miss is suppressed when data in the first main memory is accessed.

As described above, according to Embodiment 2, the ratio of the capacity of the data in the second main memory, with respect to the data in the first memory stored in the cache memory, is limited to a predetermined ratio or less, hence the frequent occurrence of a cache miss to the data in the first main memory in the cache memory is suppressed.

According to the first aspect of the present embodiment, the generation of a cache miss can be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processor, comprising:
  an arithmetic logical operation unit configured to execute an instruction; and
  a cache unit including
   a cache memory configured to store a part of data in a first main memory and a part of data in a second main memory which has a wider bandwidth than the first main memory when at least a predetermined capacity of data having consecutive addresses is accessed, and
   a cache control unit configured to read data in the cache memory responding to a memory request issued by the arithmetic logical operation unit and respond to the memory request source,
  wherein a ratio of capacity of the data in the second main memory with respect to the data in the first main memory stored in the cache memory is limited to a predetermined ratio.

2. The arithmetic processor according to claim 1, wherein the cache unit includes an address conversion unit configured to convert a logical address of the memory request to a physical address based on an address conversion table having a correspondence between a logical address and a physical address, and
  when a physical address is assigned to a logical address, the arithmetic logical operation unit assigns first and second physical addresses, generated by dividing index addresses of the cache memory in the physical address based on the predetermined ratio, to the data in the first main memory and the data in the second main memory, respectively.

3. The arithmetic processor according to claim 2, wherein the cache control unit refers to a tag of a cache line of the cache memory corresponding to the index address of the memory request, and determines that a cache hit occurred when a tag address in the tag and a tag address in the memory request match.

4. The arithmetic processor according to claim 1, wherein
  when a cache miss occurs to a memory request for data in the first main memory and the data in the first main memory is registered in the cache memory, the cache control unit evicts data in a cache line having the highest eviction priority, out of a plurality of cache lines corresponding to the index address of the memory request, and registers the registration target data in the first main memory at the lowest eviction priority in a cache line from which the data was evicted,
  when a cache hit occurs to the memory request for the data in the first main memory, the cache control unit updates the eviction priority of the cache line to which the cache hit occurs to the lowest priority,
  when a cache miss occurs to a memory request for data in the second main memory and the data in the second main memory is registered in the cache memory, the cache control unit evicts data in a cache line having the highest eviction priority, out of a plurality of cache lines corresponding to the index address of the memory request, and registers the registration target data in the second main memory at the highest eviction priority in the cache line from which the data was evicted, and
  when a cache hit occurs to the memory request for the data in the second main memory, the cache control unit does not update the eviction priority of the cache line to which the cache hit occurs, to maintain the eviction priority that is highest.

5. The arithmetic processor according to claim 4, wherein, in the cache memory, when a plurality of cache lines are selected by the index address in the cache memory, a cache line having a tag address which matches with the tag address of the memory request, out of the selected plurality of cache lines, is determined as a cache hit.

6. An information processing device, comprising:
  a first main memory;
  a second main memory which has a bandwidth wider than the first main memory when at least a predetermined capacity of data having consecutive addresses is accessed; and
  an arithmetic processor, which is accessibly connected to the first main memory and the second main memory, including
   an arithmetic logical operation unit configured to execute an instruction, and
   a cache unit which includes a cache memory configured to store a part of data in the first main memory and a part of data in the second main memory, and a cache control unit configured to read data in the cache memory responding to a memory request issued by the arithmetic logical operation unit and responds to the memory request source, wherein a ratio of capacity of the data in the second main memory with respect to the data in the first main memory stored in the cache memory is limited to a predetermined ratio.

7. A control method of an arithmetic processor comprises:

in the arithmetic processor having an arithmetic logical operation unit configured to execute an instruction, and a cache unit that included a cache memory configured to store a part of data in a first main memory and a part of data in a second main memory which has a wider bandwidth than the first main memory when at least a predetermined capacity of data having consecutive addresses is accessed, and a cache control unit configured to read data in the cache memory responding to a memory request from the arithmetic logical operation unit and respond to the memory request source, the cache control unit limiting a ratio of capacity of data in the second main memory with respect to the data in the first main memory stored in the cache memory to a predetermined ratio.

* * * * *